(12) United States Patent
Christmas et al.

(10) Patent No.: US 6,335,506 B2
(45) Date of Patent: Jan. 1, 2002

(54) LASER HARDENED STEEL CUTTING RULE

(75) Inventors: Darryl L. Christmas, Woodstock, IL (US); James C. Goossen, Glenwood City, WI (US)

(73) Assignee: J. F. Helmold & Brothers, Inc., Elk Grove Village, IL (US)

( * ) Notice: Subject to any disclaimer, the term of this patent is extended or adjusted under 35 U.S.C. 154(b) by 0 days.

(21) Appl. No.: 09/749,766

(22) Filed: Dec. 28, 2000

Related U.S. Application Data

(62) Division of application No. 09/350,999, filed on Jul. 12, 1999, now Pat. No. 6,218,642.

(51) Int. Cl.$^7$ .............................................. B23K 26/00
(52) U.S. Cl. ........................... 219/121.66; 219/121.67; 219/121.68; 219/121.69
(58) Field of Search ..................... 219/121.66, 121.67, 219/121.68, 121.69, 121.73, 121.76, 121.77; 76/101.1

(56) References Cited

U.S. PATENT DOCUMENTS

| 3,677,111 A | * | 7/1972 | Dragoo ..................... 76/101 R |
| 3,792,637 A | * | 2/1974 | Suanders ..................... 83/673 |
| 3,848,104 A | | 11/1974 | Locke ......................... 219/121 |
| 4,250,372 A | * | 2/1981 | Tani ..................... 219/121 LE |
| 4,304,978 A | | 12/1981 | Saunders ..................... 219/121 |
| 4,313,771 A | | 2/1982 | Lorenzo et al. ................ 148/14 |
| 4,323,401 A | | 4/1982 | Belke et al. ................... 148/39 |
| 4,456,811 A | | 6/1984 | Hella et al. ................... 219/121 |
| 4,459,458 A | | 7/1984 | Vetsch et al. ................ 219/121 |
| 4,507,538 A | | 3/1985 | Brown et al. ................ 219/121 |
| 4,533,400 A | | 8/1985 | Benedict ......................... 148/4 |
| 4,544,820 A | | 10/1985 | Johnson ........................ 219/69 |
| 4,600,559 A | | 7/1986 | Hiatt ............................ 422/89 |
| 4,617,070 A | * | 10/1986 | Amende et al. ............. 148/152 |
| 4,627,882 A | | 12/1986 | Söderström ................... 148/14 |
| 4,698,237 A | | 10/1987 | Macintyre ................... 427/53.1 |
| 4,781,770 A | | 11/1988 | Kar ............................ 148/16.5 |
| 5,073,212 A | | 12/1991 | Fröhlich ...................... 148/152 |
| 5,140,872 A | | 8/1992 | Holliday et al. ........... 76/107.8 |
| 5,160,556 A | | 11/1992 | Hyde et al. .................. 148/525 |
| 5,449,879 A | | 9/1995 | Lawson et al. ............. 219/121 |
| 5,531,570 A | | 7/1996 | Mannava et al. ........ 416/241 R |
| 5,889,254 A | | 3/1999 | Jones ..................... 219/121.63 |

* cited by examiner

Primary Examiner—M. Alexandra Elve
(74) Attorney, Agent, or Firm—Fitzpatrick, Cella, Harper & Scinto

(57) ABSTRACT

A hardened steel cutting rule obtained by the process of a first step of applying a first laser beam having a first intensity and focused to a first focal point to a selected surface area of a steel cutting rule, and a second step of applying a second laser beam having a second intensity and focused to a second focal point to the selected surface area. The hardened steel cutting rule may also be obtained by the process of applying a laser beam absorbent substance to a selected surface area of a steel cutting rule, applying a first laser beam having a first intensity and focused to a first focal point to the selected surface area of the steel cutting rule, and applying a second laser beam having a second intensity and focused to a second focal point to the selected surface area.

9 Claims, 8 Drawing Sheets

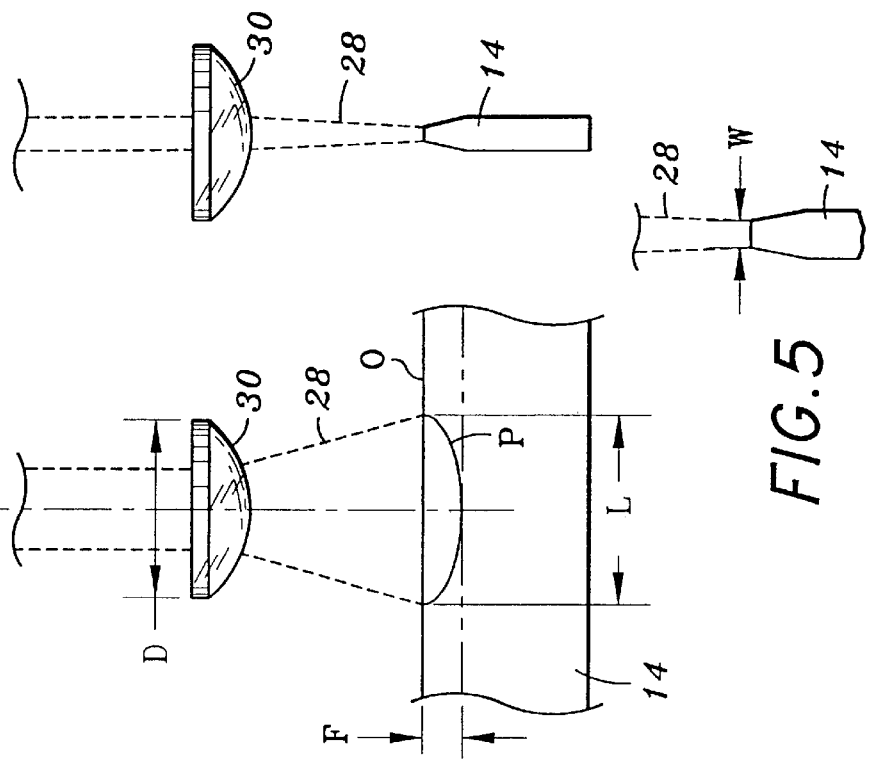
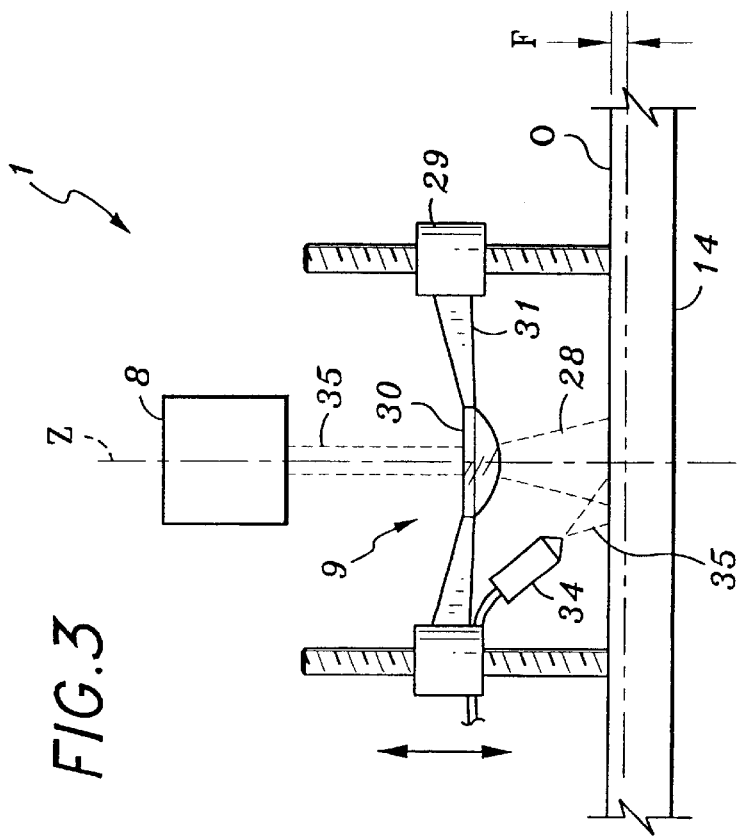
FIG.4B
FIG.4A
FIG.5
FIG.3

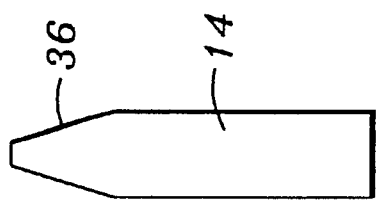
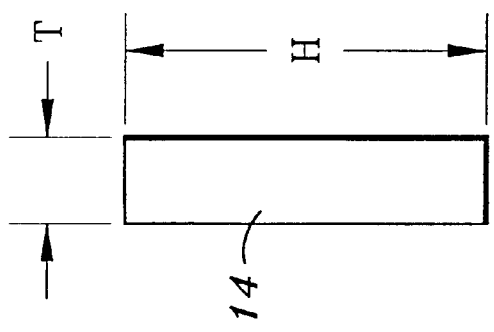
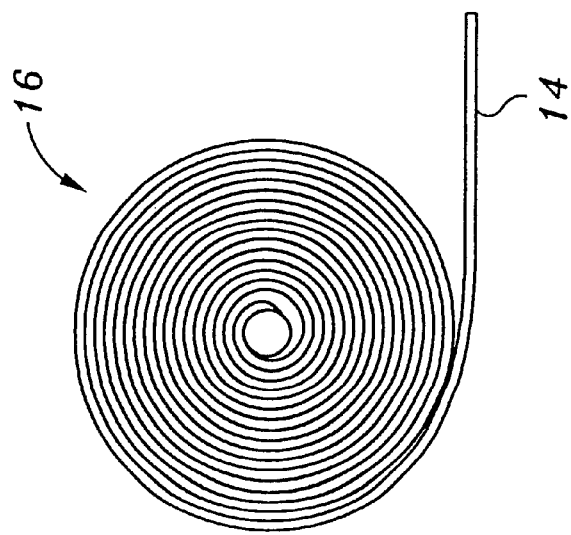

LASER HARDENED STEEL CUTTING RULE

This application is a division of application Ser. No. 09/350,999, filed Jul. 12, 1999 now U.S Pat. No. 6,218,642, Apr. 17, 2001.

BACKGROUND OF THE INVENTION

1. Field of the Invention

The present invention relates to surface hardening of steel workpieces. In particular, the present invention is a method of hardening selected surface areas of steel cutting instruments, such as cutting rules or knife blades, using laser beams to perform both surface hardening and stress relief of the workpiece.

2. Description of the Related Art

Typically, hardening of metals has been performed by carburizing, induction heating and, more recently, laser heat-treating. In conventional gas carburizing methods, a steel workpiece is heated in an atmosphere of a selected gas. Materials from the gas dissolve in the surface of the workpart becoming part of the crystalline structure. For example, a steel workpart is heated in an atmosphere of $CO_2$ causing minute amounts of carbon to be liberated on the surface of the hot metal and to dissolve in the metal. A subsequent heat treatment to form a martensitic microstructure on the surface produces a hard surface. A martensitic microstructure is formed by heating the steel above the critical temperature—the temperature at which the steel changes phases from a ferrite or cementite microstructure to an austenite microstructure—and rapidly cooling, or quenching, the steel to form a new microstructure phase, martensite. Martensite is the hardest of the steel microstructure phases.

However, the rapid cooling required to produce martensite also induces internal stresses within the microstructure that make the martensite brittle. Therefore, a subsequent tempering process is required to relieve these internal stresses. Tempering typically entails heating the steel to a temperature below the critical temperature for several hours. Heating the steel below the critical temperature avoids inducing a microstructure phase change back to austenite, but also reduces some of the hardness of the martensite. The hardness reduction is the result of some of the carbon particles trapped in the martensite being released. Thus, the microstructure before tempering appears as untempered martensite and after tempering the microstructure appears as tempered martensite.

Some drawbacks are present in surface hardening by carburizing. One such drawback is that it is difficult to surface harden only selected areas of the workpart. In order to only harden selected areas, those surfaces not to be hardened must be masked. The masking prevents those surfaces from being subjected to the gas atmosphere, thereby preventing hardening of the masked surface. The masking process is often difficult, time-consuming and unreliable due to the intense heat of the carburizing process. Another drawback of carburizing is controlling the depth of the hardened surface. Carburizing typically requires post-processing machining, such as grinding, in order to obtain the desired hardened case depth. Carburizing also requires an additional tempering process after the quenching process in order to stress relieve the part. Such a stress relief process typically entails placing the workpiece in an oven, often for a period of several hours. This significantly increases both the cost and the amount of time to process the workpiece.

Another known method of surface hardening steel workparts is induction heating. In induction heating, the steel workpart is placed within an induction coil. An electrical current is passed through the induction coil which induces secondary currents to flow along the surface of the workpart. The secondary current flow causes the surface of the workpart to be preferentially heated. As the electrical current in the induction coil is increased, the surface of the workpart is heated above the critical temperature, thus causing a microstructure phase change to austenite. When the workpart is rapidly cooled, or quenched, a martensitic microstructure is formed. Thus, when only a shallow surface of the part is heated above the critical temperature and is rapidly quenched, only the shallow surface is transformed into a martensitic microstructure while the-remainder of the part remains unchanged. This shallow surface of martensite forms the hard surface.

However, the rapid cooling induces internal stresses that cause the steel part to become brittle. Therefore, a subsequent tempering process is required to relieve the internal stresses.

Induction heating has some of the same drawbacks as carburizing. Namely, it is difficult to harden only selected surface areas and the steel workpart requires a post-hardening tempering process that is costly and time-consuming.

Additionally, shallow hardened case-depths are difficult to achieve with induction hardening. Typically, the case depth is controlled during induction hardening by producing a higher frequency current in the induction coil. However, common induction heating machines present limitations on the highest frequency available. Common induction heating machines have a frequency limit of about 1 MHz. However, if a case depth of 0.004–0.006 was desired, an induction machine frequency of approximately 10 MHz would be required. Such a machine is costly and commonly only available in Europe.

Induction heating has been the most common method of producing steel cutting rules. Steel cutting rules produced by induction heating generally provide good bendability properties, thereby allowing the rules to be formed into a number of shapes. However, induction heated rules generally have low durability properties, thereby requiring frequent replacement. Additionally, induction heated steel cutting rules require air or liquid quenching during the heat-treating process which causes thin rules to warp and further requires tempering to relieve internal stresses. The tempering process typically lowers the surface hardness previously obtained during the heat treating step. Therefore, common induction hardened rules are typically hardened to only about 55 $R_c$.

Another known method of surface hardening is laser heat-treatment. Various types of lasers are available for heat treating workpieces, including continuous wave $CO_2$ lasers. Laser heat treatment using a $CO_2$ laser typically entails applying an absorbent substance, such as black oxide or phosphate coatings, to the surface area of the part to be heated. This coating reduces reflection of the laser beam and focuses the energy of the laser beam to the area to be hardened. The laser beam is then focused, via a lens or the like, which generates an intense energy flux that rapidly heats the surface.

One distinct advantage of laser heat treatment is that the laser beam may be controlled to heat the surface of the metal piece above the critical temperature to a depth of only a few thousandths of an inch or less. Controlling the depth of the heating to this shallow level allows for self quenching. That is, no liquid or air quenching is required. Self-quenching is accomplished by conduction due to the mass and temperature disparity between the portion of the workpart not heated by the beam and the small depth of the surface heated above the critical temperature by the beam. The heat on the surface is quickly transferred to the unheated portion thereby quenching the heated surface. However, the self-quenching process has been taught to be undesirable for thin parts such as knife blades and therefore air or liquid quenching has been particularly advisable. Air or liquid quenching is required due to the insufficient mass of the part to facilitate the conduction. The addition of such air or liquid quenching increases both the cost and the processing time.

One such method of laser-treating steel workparts is disclosed in U.S. Pat. No. 4,304,978. This patent teaches laser heat treating a flat part, such as a knife or blade, by focusing a laser beam perpendicular to the major flat surface of the part using a cylindrical lens. The width of the beam is adjusted according to the desired width of the part to be heated. The part is then moved through the laser or the laser may be moved along the part to heat the surface. U.S. Pat. No. 4,304,978 teaches that thin parts, such as a knife blade, requires gas quenching to prevent melting of the part. Therefore, one shortcoming of U.S. Pat. No. 4,304,978 is that the laser treated part, such as a knife blade, is not self quenching.

Therefore, it is desirable to provide a method of hardening a steel cutting rule or knife blade so as to obtain equivalent or superior ductility properties as common induction heated rules, but with superior wear resistance. It is also desirable that the method provide for self quenching of the cutting rule or knife blade to reduce processing time and cost.

Further, it is desirable to provide a method of stress relieving the heat treated cutting rule that reduces the processing time and cost without weakening the metal part.

SUMMARY OF THE INVENTION

The present invention addresses the foregoing shortcomings of conventional steel hardening techniques by providing a method of surface hardening metal workparts while maintaining the untempered martensitic microstructure and relieving internal stresses, thereby removing brittleness usually characterized with untempered martensite but maintaining the hardness. Additionally, the present invention provides self-quenching of thin workparts, such as cutting rules or knife blades. The present invention accomplishes the above while also producing hardened cutting rules with comparable ductility properties to that of current cutting rules, but with superior durability properties.

The present invention accomplishes the foregoing by providing a process of surface hardening metal workparts by heat treating and stress relieving the parts using laser beams. The process entails first heat treating the parts using a narrowly-focused laser beam and subsequently stress relieving the parts using a laser beam of a lower intensity.

The heat treating process is controlled by adjusting the laser beam intensity in order to obtain a desired case depth, preferably a shallow case depth. The process does not require the parts to be air or liquid quenched since the process results in self-quenching of the parts.

Subsequent to the heat treating process a stress relief process is performed. The stress relief process consists of subjecting the part to the laser beam a second time, usually at a lower intensity than that used in the heat treating process. The stress relief process is controlled so as to only perform stress relief and not to temper the microstructure of the parts. The resultant microstructure after stress relief appears as untempered martensite but without the brittleness usually accompanying untempered martensite.

In one aspect of the invention, metal workparts are surface hardened using laser beams to perform both heat treatment and stress relief of the part. Prior to heat treating, a laser beam is configured to obtain the desired hardness results. After configuring the laser beam, a metal workpart is subjected to the laser beam to perform the heat treatment process. The workpart is preferably passed through the laser beam; however, the laser beam may be traversed across the workpart surface. The heat treating process is performed such that the parts are self-quenching. That is, no air or liquid quenching is required. The heat treating process forms a hard martensitic layer having a microstructure of untempered martensite. Internal stresses created in the untempered martensite layer make the untempered martensitic layer brittle, thereby requiring stress relief.

Subsequent to the heat treating process the workpart is stress relieved by being subjected to a laser beam a second time. The laser beam is reconfigured to obtain the desired results for performing stress relief. The workpart is then subjected to the laser beam for stress relief either by passing through the laser beam or by the laser beam traversing the surface of the part. The resultant microstructure after stress relief appears as untempered martensite. However, the internal stresses have been relieved. Therefore, the hardness of the martensitic layer has been retained but the brittleness has been eliminated.

In another aspect of the invention thin workparts such as steel cutting rules or knife blades are surface hardened. The process entails first heat treating and subsequently stress relieving the cutting rule. Prior to the heat treating process, a laser beam is configured to obtain the desired hardness results. During the heat treating process the cutting rule is fed through the laser beam vertically, in an upright position, such that only the cutting tip of the cutting rule is subjected to the laser beam for hardening. The tip of the cutting rule is hardened by the laser beam to form a shallow hardened case of only a few thousandths of an inch.

The cutting rule is subsequently stress relieved by being subjected to the laser beam a second time. The laser is reconfigured to obtain the desired results for performing stress relief. The cutting rule is then passed through the laser beam, thereby performing the stress relief. The microstructure of the hardened surface after heat treatment but before stress relief appears as untempered martensite. After being subjected to stress relief, the microstructure maintains its appearance as untempered martensite. However, the internal stresses have been relieved, thereby eliminating brittleness.

The process may provide for additional steps such as cleaning the cutting rule prior to the heat treatment process and application of a corrosion inhibitor after the stress relief process. Further, an additional step of applying a laser beam absorbent substance to the surface area to be heat treated may be required depending on the type of laser being used. For example, a continuous wave $CO_2$ laser beam would require a laser beam absorbent substance, whereas a YAG laser would not require application of the laser beam absorbent substance.

The resultant laser hardened cutting rule performs with the bendability properties of known cutting rules. However, the durability, wear-resistance, characteristics are greater than commonly known cutting rules.

This brief summary has been provided so that the nature of the invention may be understood quickly. More complete understanding of the invention may be obtained by reference

BRIEF DESCRIPTION OF THE DRAWINGS

FIG. 3 is an enlarged view of a central laser processing station.

FIG. 4A is an enlarged side view of the laser beam-cutting rule interface.

FIG. 4B is an enlarged front view of the laser beam-cutting rule interface.

FIG. 5 is an enlarged view of the interface shown in FIG. 4B.

FIG. 6A is a top view of a typical steel rule spring coil.

FIG. 6B is a sectional view of a typical steel rule spring coil.

FIG. 6C is a sectional view of a typical cutting rule after having a beveled edge machined on one side.

DETAILED DESCRIPTION OF THE PREFERRED EMBODIMENTS

Figure 1:
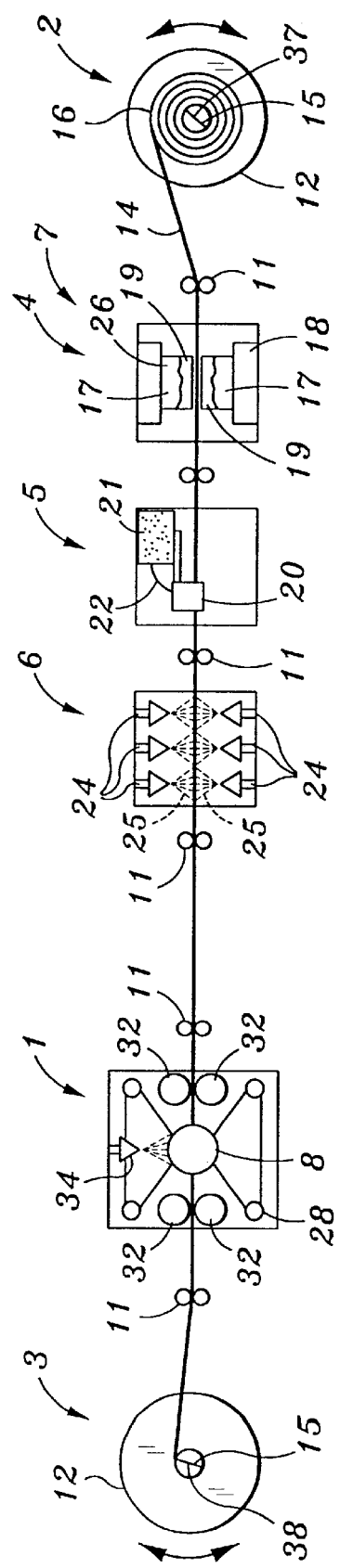
FIG. 1 is a top perspective view of a laser hardening process according to the present invention.

Referring now to the drawings, a detailed description of the preferred embodiments according to the present invention will be described.

Figure 2:
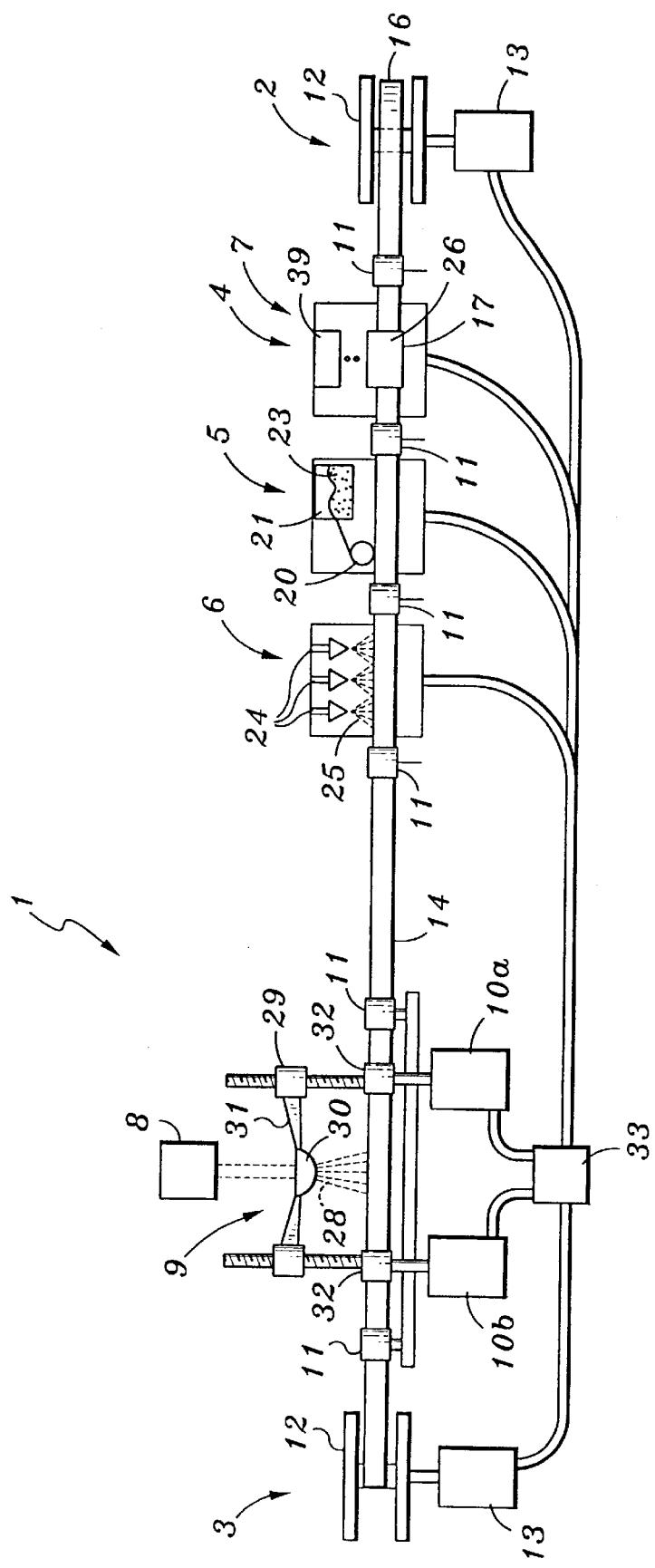
FIG. 2 is a side perspective view of a laser hardening process according to the present invention.

FIG. 1 is a top perspective view and FIG. 2 is a side perspective view of a laser hardening process setup according to one aspect of the present invention. As seen in FIG. 1 and FIG. 2, a laser heat-treating process setup for laser hardening a steel cutting rule contains a central laser processing station 1, a start/finish station 2 and an intermediate takeup station 3. Located between start/finish station 2 and central processing station 1 are cleaning station 4, laser absorbent applying station 5, laser absorbent drying station 6, and corrosion inhibitor applying station 7. Located along a path connecting start/finish station 2, cleaning station 4, laser absorbent applying station 5, drying station 6, central laser processing station 1 and takeup station 3 are a means for guiding steel cutting rule 14 through the various processing stations, such as guide rollers 11.

Start/finish station 2 and takeup station 3 provide a means for retaining cutting rule 14 during the laser hardening process. The function of stations 2 and 3 is to retain cutting rule 14, whatever the form, during the laser hardening process and to maintain tension in the cutting rule between stations 2 and 3 throughout the process. In the present embodiment, cutting rule 14 is in the form of a spring coil 16, therefore, a means compatible for retaining spring coil 16 will be described. In the present embodiment, start/finish station 2 and takeup station 3 preferably contain a spindle 12 and drive motor 13 connected via a shaft or the like. Spindle 12 contains a means for winding and unwinding spring coil 16 such as slot 15. Drive motors 13 are preferably common electrically driven motors. Drive motors 13 do not drive cutting rule 14 during the laser hardening process. Rather drive motors 13 maintain tension in cutting rule 14 between stations 2 and 3 during the laser hardening process by each applying an opposing rotational force to their respective spindles. Drive motors 13 are preferably controlled by a common programmable linear controller (PLC) 33.

Cleaning station 4 provides a means for cleaning cutting rule 14 at the initial stages of the laser hardening process. Cleaning is sometimes necessary to remove dust and dirt particles that may cause defects in the hardened surface. In the present embodiment, cleaning station 4 preferably contains cleaning pads 17 connected to actuating device 18. Cleaning pads 17 are preferably covered with a soft cloth material 19, such as cheesecloth or the like. Actuating device 18 preferably actuates in a vise-like manner applying a clamping force between cleaning pads 17.

Laser absorbent applying station 5 provides a means for applying a laser beam absorbent substance, such as a water-soluble ink or black oxide, to a selected surface area of cutting rule 14. In the present embodiment, laser absorbent applying station 5 preferably contains an applicator 20, such as a roll-on applicator, an ink reservoir 21, and a means for supplying the ink from ink reservoir 21 to applicator 20, such as tube 22. Ink reservoir 21 preferably contains a water soluble ink 23 and is preferably pressurized.

Drying station 6 provides a means for drying the laser absorbent substance applied in station 5. In the present embodiment, drying station 6 is preferably comprised of a series of air nozzles 24. Air nozzles 24 supply compressed air 25 for drying of the ink applied in the laser absorbent applying station 5.

Corrosion inhibitor applying station 7 provides a means for applying a corrosion inhibiting substance 27, such as a rust preventative oil, to the surface of cutting rule 14. In the present embodiment cleaning station 4 is reconfigured as corrosion inhibitor applying station 7 after the laser hardening process and before the stress relief process. In station 7, cleaning pads 17 are removed and replaced by oil applying pads 26. Pads 26 are soaked in a corrosion preventative oil such that when cutting rule 14 passes between pads 26, the oil is wiped onto the surface of cutting rule 14. Station 7 also preferably contains an oil drip system 37 for supplying additional oil to pads 26 during the process. Drip system 37 preferably contains a pressurized oil reservoir pressurized to cause oil to drip from an outlet in the reservoir onto pads 26.

Central laser processing station 1 provides a means for laser heat treating and laser stress relieving cutting rule 14. In the present embodiment, central laser processing station 1 preferably comprises a laser beam producing device 8, a laser beam focusing device 9, and drive motors 10a and 10b. Laser beam producing device 8 is preferably a 1,000 watt continuous wave $CO_2$ laser beam producing mechanism. As a substitute for a continuous wave $CO_2$ laser, a YAG laser may be used or any other type of laser that reaches a level of at least 500 watts continuous wave may be used. Use of a YAG laser eliminates the need for application of the water-soluble ink solution adding station, i.e. stations 5 and 6. However, a YAG laser may create a safety hazard, requiring special equipment not necessary for the use of a continuous wave $CO_2$ laser. Central laser processing station 1 may also contain a means for supplying an assist gas for facilitating the laser heating process, such as assist gas nozzle 34. Assist gas nozzle 34 may provide a gas such as nitrogen to the interface of the laser beam and the surface of the cutting rule being hardened in order to facilitate the hardening process.

Laser beam focusing device 9 preferably comprises an optical device 30 and an adjustable height optical device support 31. It has been found that when optical device 30 is a plano/convex lens, optimum laser hardening results are achieved. Optical support 31 preferably contains a linear translation mechanism 29 that provides controlled vertical translation of optic 30. Vertical translation of optic 30 provides a means for controlling the focal point of laser beam 28 which will be described in more detail below. Translation mechanism 29 is preferably a shaft having a sliding frictional lock collar or other similar arrangement. Translation mechanism 29 also preferably contains a means for measuring the translation, such as a micrometer. Translation mechanism 29 may also be a motorized translation device, such as a ball screw actuator, and may also be computer controlled.

Drive motors 10a and 10b provide rotational power to drive wheels 32. Drive wheels 32 provide a frictional force for feeding cutting rule 14 through the laser hardening process stations. Drive wheels 32 are preferably made of a substance such as rubber. Drive motors 10a and 10b are preferably common electrically driven motors synchronously controlled by a common programmable linear controller 33. Controller 33 provides a proper feed rate for performing both the heat treating and stress relief processes on cutting rule 14.

Having obtained the processing stations setup according to the foregoing, a description will now be made of the laser hardening process for laser hardening a steel cutting rule. Prior to performing the laser hardening process, central laser processing station 1 is configured to obtain the desired laser hardening results, and the steel cutting rule is prepared and installed in the laser processing setup.

Referring now to FIGS. 3, 4a, 4b, and 5 a detailed description will be made of the laser beam settings and adjustment according to one aspect of the present invention.

As seen in FIG. 3, central laser processing station 1 comprises a laser beam producing device 8 and laser beam focusing device 9. Laser beam producing device 8 is preferably a 1,000 watt continuous wave $CO_2$ laser that produces a D-mode laser beam 35. Laser beam focusing device 9 comprises optic 30 and adjustable height optic support 31. Optic 30 is preferably a 1-½ inch diameter, 5 inch focal length plano/convex optic and is connected to optic support 31. Optic support 31 preferably contains a linear translation mechanism 29 that provides a means for focusing laser beam 28. In the present embodiment, translation mechanism 29 preferably contains a shaft and sliding collar having a frictional lock and a means for measuring the translation, such as a micrometer. Upon actuation of translation mechanism 29, optic 30 translates vertically along a Z axis, thereby providing for adjustment of the focal point of laser beam 28. The focal point reference origin O is preferably the cutting edge surface of cutting rule 14. Utilizing cutting surface O as a reference, a focal distance F may be obtained.

The laser beam power setting and focal point are first established for the heat treating process. The power settings for the heat treating process of the present embodiment preferably comprise a laser beam power setting of between 500 to 550 watts. The 50 watt range is used as a variable for adjusting the hardened surface case depth. It should be noted that there is an almost limitless number of options available to obtain a desired hardness result. For example, the laser power setting and focal point may each be independently varied to obtain a desired hardened surface case depth. Additionally, the rate at which the workpart is fed through the laser beam may also be varied in order to obtain a desired result. Therefore, the laser power settings, focal point, and feed rates described herein have been found to produce the optimum results for the present invention. As seen in FIG. 4A, the laser beam focal point referenced from surface O is optimally 0.010 inch as designated by dimension F. For the heat treating process the laser beam dimensions L and W, as seen in FIGS. 4A and 5, are approximately 1-¼ inch and 0.010 to 0.012 inch, respectively. The resultant beam has a substantially parabolic shape as denoted by P in FIG. 4A.

After having obtained the laser hardening process configuration and laser beam adjustments according to the foregoing, a steel cutting rule raw material is prepared for the laser hardening process. As seen in FIGS. 6A and 6B, the steel cutting rule raw material commonly comes in a spring coil 16 form. The cutting rule raw material commonly has a rectangular cross-section, as seen in FIG. 6B. The preferred dimensions of the steel cutting rule raw material according to the present embodiment are a thickness T of 0.021 to 0.042 inches and a height H of two inches or less. However, thicknesses up to 0.084 inch may also be used. The preferred material for the cutting rule according to the present embodiment is AISI 1050 spring steel. The preferred body hardness of the raw material is 33–35 $R_c$ and has a grain structure consisting mainly of tempered martensite with as much as 10–15% bianite. However, other material types and sizes may also be utilized. As seen in FIG. 6C, a beveled edge 36 is machined on one side of the steel cutting rule raw material. Beveled edge 36 may be machined by common methods such as grinding or forming. Having machined beveled edge 36, steel cutting rule coil 16 is now ready for installation in the laser hardening process system.

As seen in FIG. 1, steel cutting rule coil 16 is installed in start/finish station 2. Steel cutting rule coil 16 is installed on spindle 12 with free end 37 on the innermost portion of coil 16 installed in slot 15 on spindle 12. The outermost free end 38 of spring coil 16 is fed through the various processing stations and into slot 15 of spindle 12 in intermediate takeup station 3. The portion of steel cutting rule 14 initially fed through the processing stations is not subjected to the laser hardening process. Rather, it is excess material, known as lead, to be discarded after the laser hardening process.

Upon commencing the laser hardening process, steel cutting rule 14 is fed through the laser hardening process by drive motor 10a with drive motor 10b being idle. The speed of drive motor 10a is controlled by programmable linear controller 33 and is preferably set to a feed rate of about 125 feet per minute. It has been found that a feed rate of 125 ft./min. coupled with the previously described laser beam settings of 500–550 watts with a 0.010 focal distance from origin O provide the optimum laser hardening results. However, as previously described, the feed rate may be varied according to a desired hardness result. Drive motors 13 in stations 2 and 3 are also controlled by controller 33. Drive motors 13 apply opposing rotational forces to their respective spindles 12 to maintain tension in cutting rule 14 during the laser hardening process.

The first step of the laser hardening process is to clean the cutting rule in cleaning station 4. In the present embodiment of the invention, steel cutting rule 14 passes between cleaning pads 17 in cleaning station 4. Actuating device 18 supplies a clamping force between pads 17 sufficient to supply wiping of steel cutting rule 14 but not excessive such as to cause binding of steel cutting rule 14. Steel cutting rule 14 is wiped clean by cloth 19 attached to cleaning pads 17. Although described in terms of the present embodiment, alternate embodiments for cleaning station 4 may be used. For example, cutting rule 14 may be cleaned by air curtains or a spray nozzle which dispenses a cleaning solution rather than being wiped by cloth 19. After passing through cleaning station 4 steel cutting rule 14 next passes through laser absorbent applying station 5.

In laser absorbent applying station 5, a laser beam absorbent substance such as a water-soluble ink or black oxide is applied to a selected surface area of steel cutting rule 14. In the present embodiment of the invention, a water-soluble ink solution is applied to cutting edge O of steel cutting rule 14. The ink solution is applied by an applicator 20, such as a roll-on or drip applicator. Applicator 20 is connected to an ink reservoir 21 containing a water-soluble ink 23. Ink reservoir 21 is preferably pressurized by an external pressure source, such as compressed air, to a pressure of approximately 5 psi (pounds per square inch). Pressurization of ink reservoir 21 is preferably sufficient to cause the water-soluble ink 23 to flow to applicator 20 at a desired rate in order to effect optimum application of the water-soluble ink solution 23 to the selected surface of cutting rule 14. Pressurization of ink reservoir 21 is preferably controlled by programmable linear controller 33. As steel cutting rule 14 passes through applying station 5, water-soluble ink solution 23 is applied by applicator 20 to the selected surface area of steel cutting rule 14 to be hardened. Although described in terms of the present embodiment, alternate laser absorbent materials and application methods may also be used. For example, a black oxide or phosphate coating may be applied rather than ink. Additionally, the laser absorbent material may be applied by an alternate applying means such as a spray nozzle. After application of the water-soluble ink solution, steel cutting rule 14 next passes through drying station 6.

Drying station 6 contains a means for drying the laser absorbent substance applied in station 5. In the present embodiment of the invention, drying station 6 preferably contains a series of air curtains 25. Air curtains 25 preferably comprise compressed air supplied by a series of air nozzles 24. The air pressure supplied to nozzles 24 is preferably regulated to approximately 80 psi and is preferably controlled by programmable linear controller 33. The air pressure supplied by nozzles 24 is preferably sufficient to dry water-soluble ink solution 23 but insufficient to cause removal of the ink solution from the surface. Alternate methods of drying the laser absorbent substance may also be employed. For example, a heat source may be applied to the laser absorbent substance in order to dry it. After passing through drying station 6, steel cutting rule 14 next passes through central laser processing station 1.

Having obtained the laser power settings of 500-550 watts and focal point of 0.010 inch from cutting edge surface O according to the foregoing description, steel cutting rule 14 is heat treated by passing steel cutting rule 14 beneath laser beam 28. The laser beam intensity at the cutting rule surface is sufficient to cause a shallow depth of the cutting rule surface to be heated above the transformation temperature, thereby changing the phase of the steel to austenite. After passing through laser beam 28 and being transformed to austenite, the shallow surface area is rapidly cooled by self-quenching, thereby transforming the steel phase to martensite. The resulting martensite layer formed by the laser heat treating process preferably has a hardness of at least 60 $R_c$ and a case depth of about 0.004 to 0.006 inches. A shallow depth of 0.004 to 0.006 inch has been found to provide optimum surface hardness and ductility properties. However, case depths between 0.001 to 0.010 may be obtained by varying the laser power settings, focal point and feed rate. The hardened surface provides increased wear resistance, thereby increasing the longevity of cutting rule 14 and reducing the cost of requiring frequent replacement of the cutting rule. Furthermore, the hardened surface depth is shallow enough that the cutting rule maintains its ductility properties, thereby allowing the cutting rule to be bent or formed into a number of shapes after being laser hardened.

Figure 9A:
FIG. 9A is a photograph of a cross-section of a steel cutting rule before heat treating.
Figure 9B:
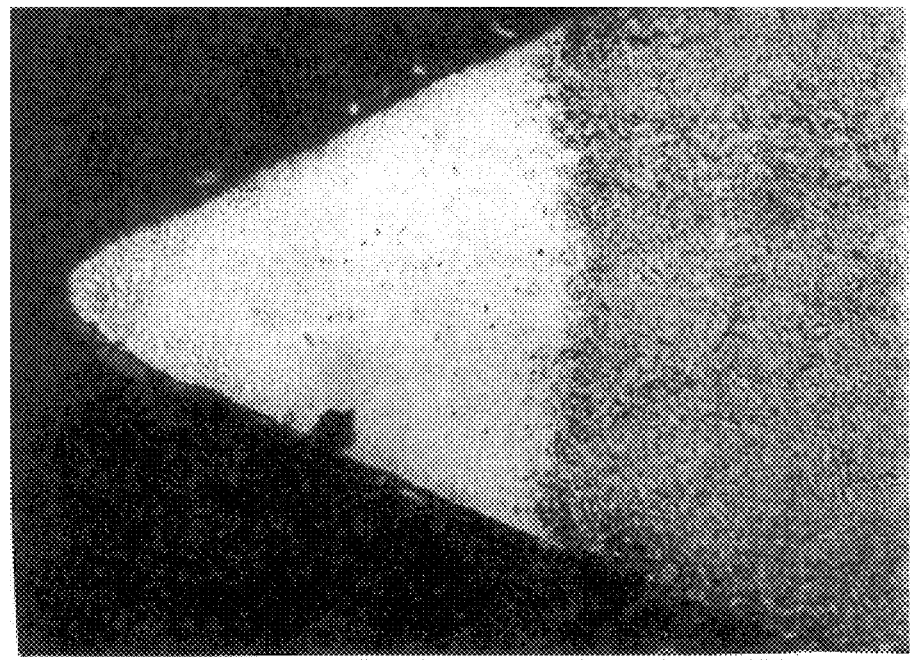
FIG. 9B is a photograph of a cross-section of a steel cutting rule grain microstructure after laser heating but before stress relief.
Figure 11:
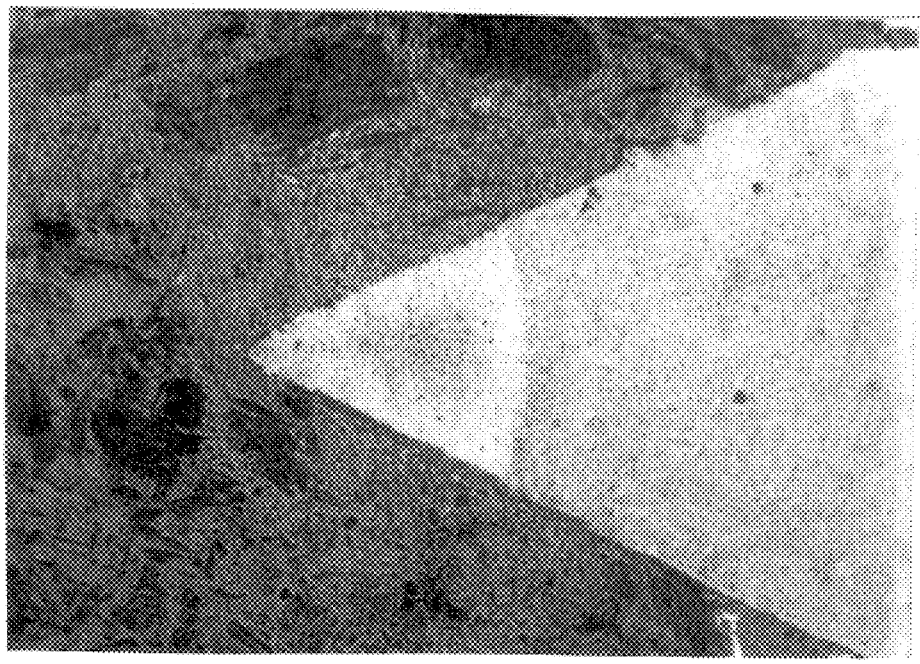
FIG. 11 is a photograph of a cross-section of a steel cutting rule after being surface hardened by induction heating.

FIG. 9A is a photograph of a cross-section of a steel cutting rule prior to being subjected to the foregoing laser heat treatment process. FIG. 9B is a photograph of a cross-section of a steel cutting rule after being subjected to the foregoing laser heat treatment process. As seen in FIG. 9B, the tip of the cutting rule has been heated and contains a grain microstructure that has an appearance of untempered martensite. The heat treated surface area is depicted by the white area in the tip of the cutting rule. It should be noted that the laser heat treatment process of the present invention results in a uniform grain structure throughout the heat treated tip area. In contrast, FIG. 11 is a photograph of a cross section of a common induction hardened steel cutting rule having a non-uniform heat treated tip. As seen in FIG. 11, a grayish area in the middle of the heat treated tip has not been heat treated, thereby resulting in a non-uniform heat treatment process. This results in a lower surface hardness than that achieved by the foregoing laser heat treatment process.

The hard untempered martensitic layer formed by the foregoing laser heat treatment process contains internal stresses that make the hardened surface brittle. In order to remove the internal stresses, a stress relief process must be performed. The stress relief process for the present invention is described in more detail below. The next processing station after cutting rule 14 passes through laser processing station 1 for the heat treatment process in intermediate takeup station 3.

In the present embodiment of the invention, intermediate takeup station 3 winds steel cutting rule 14 back into the form of a spring coil. This is accomplished by drive motor 13 in station 3 applying a rotational force to spindle 12, thereby causing steel cutting rule 14 to wrap around spindle 12 forming coil 16. Although described in terms of a coil winder, takeup station 3 may provide for an alternate method to takeup the steel cutting rule after the laser hardening process has been accomplished. After all of the steel cutting rule has passed from station 2 to station 3, the process is reversed to perform stress relief of the laser hardened surface.

In the present embodiment of the invention, prior to performing the stress relief, central laser processing station 1 is reconfigured to perform the stress relief and cleaning station 4 is reconfigured into corrosion inhibitor applying station 7.

Central laser processing station 1 is reconfigured by adjusting the laser beam power setting and by adjusting the focal point of the laser beam. The laser beam power setting for performing the stress relief is preferably set to about 80 watts below the power setting for the heat treating process. For example, a power setting of 500 watts for heat treating would require a power setting of about 420 watts for stress relief. The focal point of the laser beam is adjusted by adjusting translation mechanism 29, thereby adjusting the distance of optic 30 from the laser hardened surface O. The focal point of laser beam 28 for the stress relief process is preferably set to 0.170 inch from cutting surface O, thereby defining dimension F, as seen in FIG. 4A. It has been found that the 80 watt power setting differential coupled with the 0.170 inch focal distance from cutting edge O provides for the optimum stress relief results. However, as previously discussed, the power settings, focal point and feed rate may be varied as desired to achieve a desired result.

Cleaning station 4 is reconfigured into corrosion inhibitor applying station 7 by removing cleaning pads 17 and installing corrosion inhibitor applying pads 26 in place of cleaning pads 17. Corrosion inhibitor applying pads 26 are preferably soaked in a corrosion preventive oil prior to installation onto actuating device 18. Corrosion inhibitor applying station 7 also preferably contains a reservoir 39 of corrosion preventive oil and a means for supplying the oil from the reservoir 39 to applying pads 26. Reservoir 39 is also preferably pressurized similar to reservoir 21 in applying station 5 and the pressurization is preferably controlled by programmable linear controller 33. The pressurization is preferably controlled to provide a predetermined continuous drip rate of the corrosion preventive oil from reservoir 39 to oil applying pads 26. supplying a continuous drip of oil from reservoir 39 to pads 26 ensures that pads 26 remain soaked with the oil and thereby ensuring the oil is applied to cutting rule 14.

After having reconfigured stations 1 and 7, cutting rule 14 is prepared for the stress relief process. Free end 37 of cutting rule 14, now contained on intermediate takeup station 3, is fed through the processing stations and back onto spindle 12 in start/finish station 2. Free end 37 is installed in slot 15 of spindle 12 such that upon application of a rotational force by drive motor 13 to spindle 12, cutting rule 14 is wound back into the form of a coil 16.

Upon commencement of the stress relief process, steel cutting rule 14 is fed through the processing stations by drive motor 10b while drive motor 10a remains idle. Drive motor 10b is preferably controlled by programmable linear controller 33 and is set to provide a feed rate of about 155 feet per minute. It has been found that a feed rate of 155 ft./min. coupled with the laser settings of 80 watts below the heat treating power setting and a 0.170 focal distance, provide optimum stress relief results. However, as mentioned, these variables may be adjusted in order to achieve a desired result.

During the stress relief process steel cutting rule 14 first passes through central laser processing station 1. The selected surface area of steel cutting rule 14 which was previously hardened during the heat treating step is now subjected to laser beam 28 a second time to perform stress relief. Laser beam 28's intensity is set such that only stress relief is performed while retaining the previously hardened untempered martensite microstructure. one objective of the present invention is to relieve the internal stresses in the untempered martensite layer formed in the heat treating step without substantially reducing the hardness of the untempered martensite.

Typically, the stress relief process relieves internal stresses by releasing some of the carbon particles trapped in the microstructure when the untempered martensite was formed. The release of these carbon particles from the microstructure reduces the hardness of the untempered martensite and also changes its microstructure appearance to tempered martensite. However, in the present invention, the laser beam power setting and focal point are established such that the internal stresses are relieved but the microstructure retains its appearance as untempered martensite.

Figure 10:
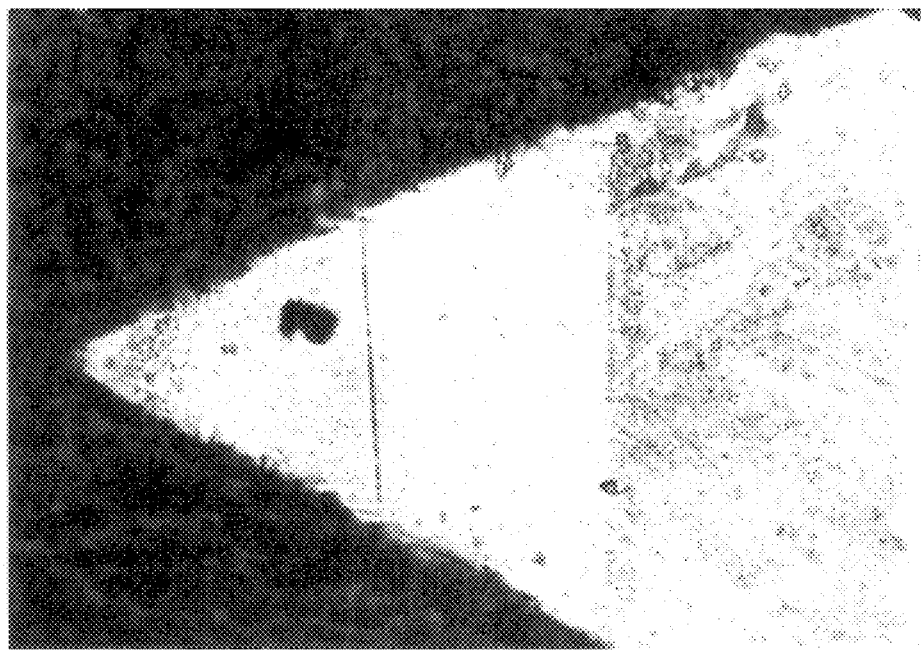
FIG. 10 is a photograph of a cross-section of a steel cutting rule grain microstructure after being both laser heat treated and stress relieved.

FIG. 10 is a photograph of a cross-section of a steel cutting rule after being subjected to the foregoing stress relief process. As seen in FIG. 10, the previously heat treated tip of the cutting rule retains its appearance as untempered martensite. However, since the internal stresses have been relieved, the brittleness has been removed. The resultant steel cutting rule has a surface hardness of at least 60 $R_c$, about 5 $R_c$ higher than conventional cutting rules, but has equivalent ductility properties since the brittleness has been removed. After being stress relieved in central laser processing station 1, steel cutting rule 14 moves on to corrosion inhibitor applying station 7.

Upon entering corrosion inhibitor applying station 7, steel cutting rule 14 passes between corrosion inhibitor applying pads 26. Pads 26 are preferably soaked in a corrosion preventive oil. Actuating device 18 applies a clamping force between pads 26, such that as cutting rule 14 passes between pads 26, corrosion preventive oil is wiped onto the surface of cutting rule 14. As the stress relief process proceeds, reservoir 39 is pressurized by an external pressure source preferably to about 5 psi. The pressure is sufficient to provide a continuous drip of oil contained within the reservoir to be applied to pads 26, thereby maintaining saturation of pads 26. Although the present embodiment employs a wipe-on method of applying corrosion preventive oil, alternate methods such as a spray or immersion bath application may also be employed.

Upon completion of the stress relief process, steel cutting rule 14 is wound into the form of a spring coil 16 and is retained in start/finish station 2. Spring coil 16 is then removed from station 2 and is now ready for use in its final form.

Figure 7:
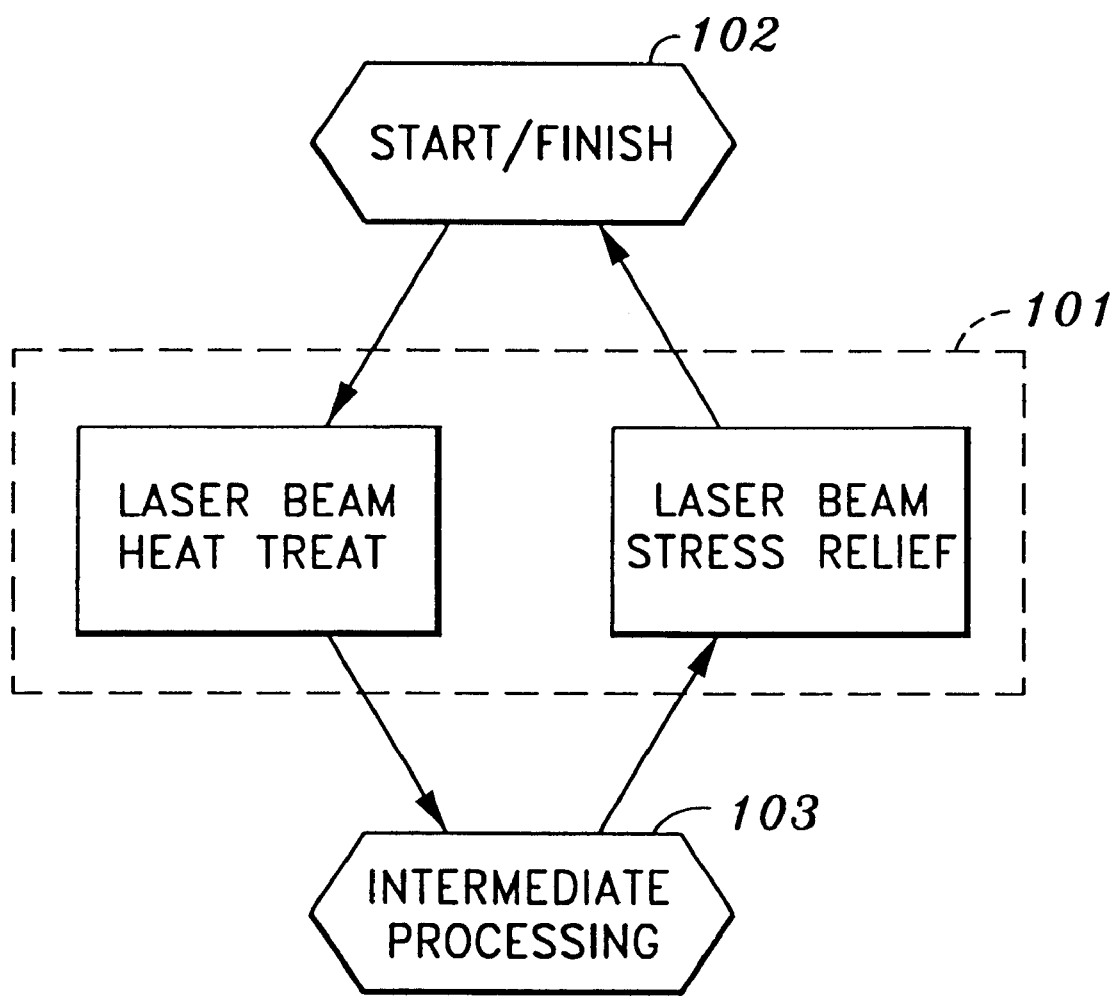
FIG. 7 is a flow diagram for a laser hardening process.

In another aspect of the invention the foregoing laser hardening process is utilized in laser hardening a metal workpart. The metal workpart is not limited to the form of a steel cutting rule but may be in any form such as a shaft or a flat plate. As seen in FIG. 7, the metal workpart is surface-hardened by being processed through central laser processing station 101. Central laser processing station 101 may be similar to central laser processing station 1 according to the foregoing description. Central laser processing station 101 performs both a laser heat treat process and a stress relief process similar to the foregoing description. The laser beam configuration, such as the power settings and focal point, are adjusted according to the foregoing description in order to perform both the laser heat treatment and the stress relief process on the metal workpart. The metal workpart may be passed through central laser processing station 101 by means such as a conveyor belt or other similar means or central laser processing station 101 may be traversed across a stationary metal workpart. The metal workpart is first heat treated by being subjected to the laser beam, thereby forming a hard surface layer having an appearance of untempered martensite. The metal workpart is then stress relieved by being subjected to the laser beam a second time similar to the foregoing description. After the stress relief process, the metal workpart microstructure retains its appearance as untempered martensite. However, internal stresses have been relieved, thereby removing brittleness.

Figure 8:
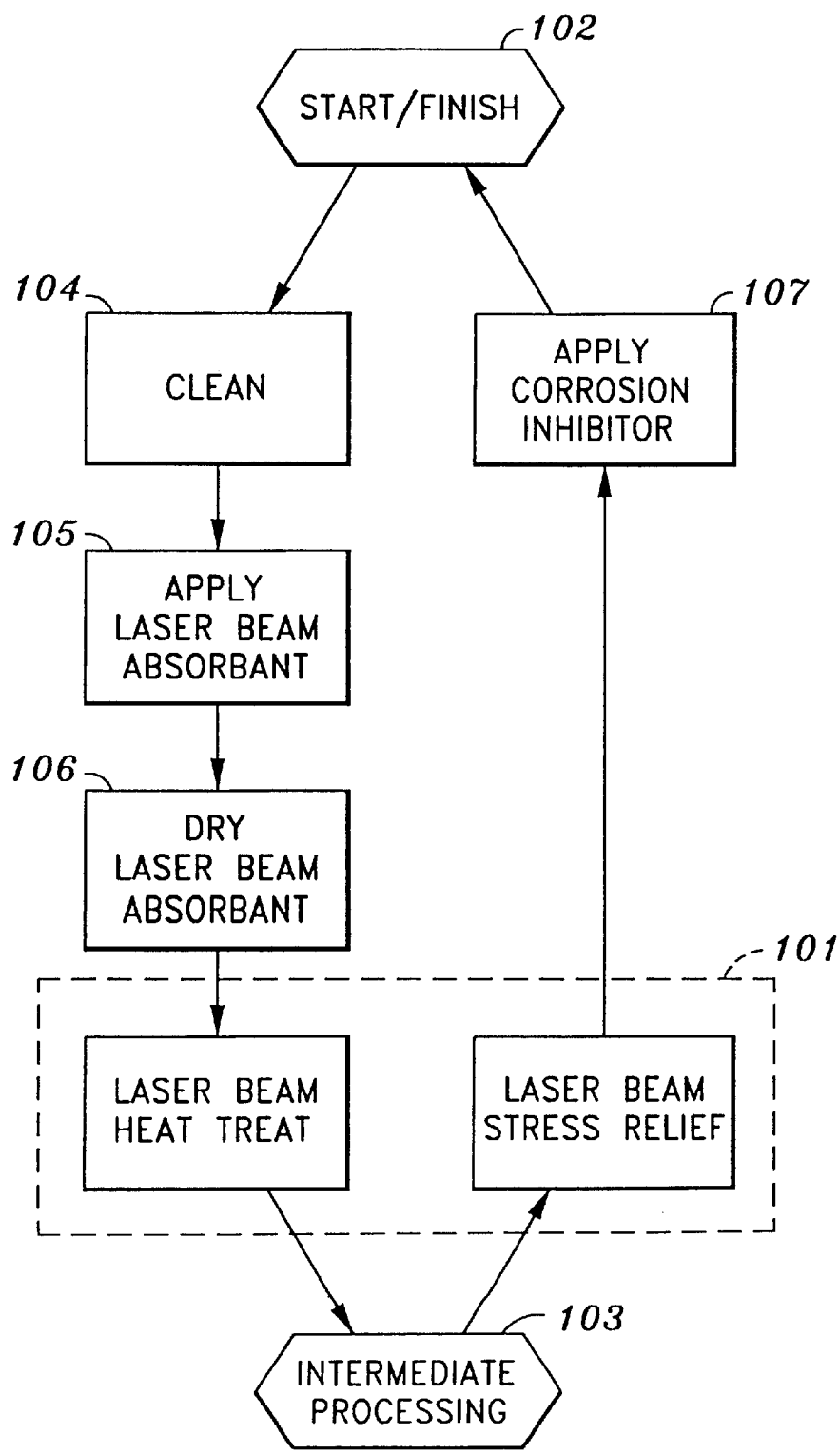
FIG. 8 is a flow diagram for a laser hardening process.

The metal workpart may also be subjected to additional processing steps, such as cleaning station 104, laser beam absorbent applying station 105, laser beam absorbent drying station 106 and corrosion inhibitor applying station 107, as seen in FIG. 8. Stations 104 through 107 as seen in FIG. 8 are similar to stations 4 through 7 according to the foregoing description. Accordingly, the metal workpart may be cleaned by methods such as a dry cloth wipe, spray on cleaning solution or being subjected to an air curtain. Also, a laser beam absorbent substance may be applied to the surface area of the metal workpart depending on the type of laser beam used in the laser hardening process. The laser beam absorbent substance may be applied by various methods, such as roll on or spray on application. Additionally, the laser beam absorbent substance may require drying, such as being subjected to a series of air curtains or a heat source. Further, a corrosion inhibiting substance such as oil may be applied to the surface of the metal workpart after being subjected to the stress relief process.

Although the present invention has been illustrated with reference to certain preferred embodiments, it will be appreciated that the present invention is not limited to the specifics set forth therein. Those skilled in the art readily will appreciate numerous variations and modifications within the spirit and scope of the present invention, and all such variations and modifications are intended to be covered by the present invention, which is defined by the following claims.

What is claimed is:

1. A hardened steel cutting rule obtained by the process comprising the steps of:
    a first step of applying a first laser beam having a first intensity and focused to a first focal point to a selected surface area of a steel cutting rule; and
    a second step of applying a second laser beam having a second intensity and focused to a second focal point to the same selected surface area in which the first laser beam has been applied.

2. A hardened steel cutting rule obtained by the process comprising the steps of:
    applying a laser beam absorbent substance to a selected surface area of a steel cutting rule;
    applying a first laser beam having a first intensity and focused to a first focal point to said selected surface area of said steel cutting rule; and
    applying a second laser beam having a second intensity and focused to a second focal point to the same selected surface area in which the first laser beam has been applied.

3. A hardened steel cutting rule according to claim 1, wherein in the first applying step, the first laser beam having the first intensity performs a surface hardening process that increases a property of the selected surface area.

4. A hardened steel cutting rule according to claim 3, wherein in the second applying step, the second laser beam performs a tempering process to relieve internal stresses in the surface area hardened by the first laser beam.

5. A hardened steel cutting rule according to claim 4, wherein the property is a surface hardness of the selected surface area, and wherein, after the second applying step, the surface hardness property of the selected surface area is at least 60 $R_c$.

6. A hardened steel cutting rule according to claim 2, wherein in the first laser beam applying step, the first laser beam having the first intensity performs a surface hardening process that increases a property of the selected surface area.

7. A hardened steel cutting rule according to claim 6, wherein in the second laser beam applying step, the second laser beam performs a tempering process to relieve internal stresses in the surface area hardened by the first laser beam.

8. A hardened steel cutting rule according to claim 7, wherein the property is a surface hardness of the selected surface area, and wherein, after the second applying step, the surface hardness property of the selected surface area is at least 60 $R_c$.

9. A hardened steel cutting rule obtained by the process comprising the steps of:
    a surface hardening step of applying a first laser beam having a first intensity and focused to a first focal point to a selected surface area of a steel cutting rule; and
    a tempering step of applying a second laser beam having a second intensity lower than the first intensity and focused to a second focal point to the same selected surface area in which the first laser beam has been applied.

* * * * *